United States Patent Office
2,933,452
Patented Apr. 19, 1960

2,933,452

DISPERSANT AND METHOD OF MAKING THE SAME

Gerald J. Byrd, Calgary, Alberta, Canada, assignor to Lignosol Chemicals Limited, Quebec, Quebec, Canada No Drawing. Application September 7, 1956
Serial No. 608,444

6 Claims. (Cl. 252—353)

This invention relates to anti-flocculating agents or dispersants for solid-in-liquid suspensions and a method for making the same.

Many industrial processes involve the preparation and handling of suspensions of finely divided materials in liquid, frequently in aqueous media. Under normal conditions the particles in such suspensions tend to agglomerate and flocculate into lumps. This action leads to the formation of loosely bonded agglomerates with the occlusion of large amounts of the suspending medium, the viscosity of the suspension tends to rise and the rate of settling of the solid material tends to increase.

In order to avoid these undesirable effects small amounts of dispersants or deflocculating agents are often added to suspensions. It is believed that these materials are effective through being adsorbed on the surface of the particles which thereby acquire an electrical charge which tends to produce a mutual repulsion and to overcome their natural tendency to agglomeration. The net result of the use of an adequate deflocculant is marked decrease in viscosity of the suspension or conversely an increase in the concentration of suspended solids at the same viscosity. A further result of the addition of a dispersant is a decrease in the thixotropy, and also a decrease in the yield value which is indicative of the tendency for the suspensions to increase in viscosity on standing.

A large variety of materials, many of which are polyelectrolytes, have been used as dispersants. The effect is often specific in that one defflocculant will be effective with only one material or only one class of materials. Further, there are many suspensions for which an adequate dispersant has not been found.

The object of this invention is to provide a dispersant which is active in a wide variety of suspensions and which is effective in suspensions for which an adequate dispersant has not heretofore been found.

It is a further object to provide a sulphite liquor product which is highly effective as a dispersant in solid-in-liquid suspensions, made chiefly from waste sulphite liquor which is readily available in large quantities as a by-product in sulphite pulp-making processes.

The invention broadly comprises the reaction product of concentrated, partially oxidized sodium base sulphite liquor and between 5 and 25% by weight of solids of alkali metal dichromate.

The base material in the production of the dispersant is sodium base sulphite liquor. This liquor is preferably obtained by replacement of the calcium ions in a lime base sulphite liquor with sodium ions as described in Canadian Patent 505,355, but liquor obtained by the cooking of wood with sodium bisulphite cooking liquors may also be used as may liquor in which the calcium is replaced by sodium by other methods. The liquor having been brought to a total solids content of about 50% and with the pH preferably adjusted to about 7, is introduced into a pressure vessel. It is there heated to a temperature of 270 to 300° F., either with live steam or by means of heat exchange through a coil. Air is then admitted through a sparger at the rate of about 0.5 to 1 cubic foot per minute for each gallon of liquid in process to partially oxidize the material. A minimum reaction time of about 1 hour is required for best properties and at lower air flow rates reaction times up to 3 hours may be necessary. The pH of the product (initially about 7) decreases as the oxidation treatment proceeds and best results are normally obtained at a final pH of 4. to 4.5. Prolonging the treatment time will impair the properties of the product. It should not exceed 4 hours at the higher rates of air flow or 6 hours at the lower rates. The pH should not be allowed to drop below 3.5 during treatment.

At the completion of the air treatment the liquor is mixed with sodium or potassium dichromate in an amount to give not less than 5% nor more than 25% of dichromate calculated on the total weight of the solids present. The mixture is then spray dried under normal conditions as to temperature and air flow. Typical temperature conditions are 520 and 300° F. on the inlet and outlet air respectively.

The spray drying operation in itself presents no unusual problems but certain precautions must be observed in the treatment of the compounded product prior to spray drying. Lignin dichromate mixtures are subject to a tendency to form insoluble gels. The rate of this reaction is governed by the proportion of dichromate salt in the mixture and by the solids concentration and pH as well as the temperature of the solution. The viscosity increase which precedes the gel formation creates difficulties in transfer and spray drying of the liquid, while the formation of the gel makes it impossible to carry out this operation. The dispersing properties of the material are also impaired by the reactions associated with the viscosity increase and gel formation. This is particularly true when the dispersant is used in line base drilling muds where it will give rise to a highly thixotropic (i.e. very high "10 minute gels") mud. These difficulties may be overcome by adjustment of the concentration of the solution and by close control of the elapsed time between the addition of the dichromate salt and the conversion to powder in the spray drier.

Normal feed to spray driers of materials of this type contain about 50% total solids. At this concentration a gel would be formed almost immediately on the addition of a dichromate salt. At 30% concentration, including the dichromate content, the onset of the gel formation, as well as of the impairment of dispersing properties, will be delayed by about 30 minutes. At 40% concentration a delay of about 15 minutes may be safely tolerated.

In order to operate within these conditions it is necessary that the dichromate salt in the form of solution be mixed continuously with the lignin solution. The concentration of the dichromate solution may be adjusted so as to give the required concentration in the final solution. Mixing may be carried out in a centrifugal pump or similar equipment designed to give high turbulence. Pipe lines leading to the spray drier should be kept as short as possible and intervening tanks should be eliminated. Preferably feed should be made directly from the feed pump to the atomizer of the drier but if a gravity feed to the atomizer is essential the head tank should be made as small as possible.

EXAMPLE

Dilute lime base sulphite liquor was treated with sulphur dioxide to total titratable sulphur dioxide content of about 0.80% and was then neutralized with sodium hydroxide to a pH of 7. After filtration to remove the precipitated calcium sulphite, the liquor was evaporated to a solids content of 50%. 300 gallons of the evaporated liquor was introduced to an autoclave and the charge brought to 295° F. by the introduction of live steam. Air was then admitted through a sparger at the rate of 150 cubic feet per minute (in terms of air at atmospheric pressure) and the treatment continued for 2 hours, sufficient steam being added to maintain the temperature at the same level. At the completion of the treatment the charge was blown from the autoclave and mixed continuously with a sodium dichromate solution to give 15% sodium dichromate on the total weight of material at 30% total solids in the solution. The mixture was spray dried concurrently with the mixing operation with an elapsed time between mixing and spray drying of 15 minutes.

The behaviour of the product as a dispersant at three stages in manufacture is outlined below. A slurry of iron oxide containing 45% total solids was prepared, divided into three parts and into each part, 0.65% (calculated on the basis of the iron oxide present), of the sodium base sulphite liquor solids, the liquor after treatment with air and the air treated liquor after addition of sodium dichromate, respectively, was added. After vigorous agitation the viscosities of the three slurries were measured on a McMichael viscosimeter. The results are shown in Table I.

Table I

Viscosity, cps.
(1) Sodium Base sulphite liquor solids_____ 25.0
(2) Sodium Base sulphite liquor solids air treated 2 hours_____ 16.0
(3) Sodium Base sulphite liquor solids air treated 2 hours plus $Na_2Cr_2O_7$_____ 9.0

Similar tests were carried out on a zinc oxide slurry containing 55.5% total solids. On this slurry 0.60% dispersant was used in each case. The results are shown in Table II.

Table II

Viscosity, cps.
(1) Sodium Base sulphite liquor solids_____ 30.0
(2) Sodium Base sulphite liquor solids air treated 2 hours_____ 19.9
(3) Sodium Base sulphite liquor solids air treated 2 hours plus $Na_2Cr_2O_7$_____ 14.4

I claim:

1. The method of making a dispersant for solid-in-liquid suspensions which comprises heating concentrated sodium base waste sulphite liquor, containing substantially 50% solids and having a pH of substantially 7, in a closed vessel at a temperature of 270 to 300° F., passing air into the vessel to oxidize the liquor to a pH of 3.5 to 4.5, mixing with the liquor an aqueous solution of at least one of a group consisting of sodium and potassium dichromate to provide not less than 5 nor more than 25% by weight of the solids present of the dichromate, continuously mixing the dichromate to substantially reduce the solids content of the mixture to avoid gel formation and substantially concurrently spray drying the mixture.

2. The method of claim 1 wherein said liquor is oxidized by passing air under pressure thereinto at the rate of 0.5 to 1.0 cubic feet per minute per gallon thereof for from 1 to 6 hours at elevated temperature.

3. The method of claim 1, said mixture containing not more than 40% by weight total solids and said mixture being spray dried within 15 minutes of the addition of dichromate.

4. The method defined in claim 1 wherein sufficient dichromate solution is added to reduce the solids content of the mixture to substantially 30% and the spray drying is effected within substantially 30 minutes of the dichromate addition.

5. A dispersant for solid-in-liquid suspensions consisting essentially of the gel-free reaction product of oxidized sodium base sulphite liquor solids and at least one of a group consisting of sodium and potassium dichromate in an amount equal to 5 to 25% of the weight of the oxidized sodium base sulphite liquor solids as produced by the method defined in claim 1.

6. A method of making a dispersant for solid-in-liquid suspensions comprising concentrating sodium base sulphite liquor to substantially 50% by weight solids at a pH of 7, passing air thereto at a temperature of 270 to 300° F. at 0.5 to 1.0 cubic feet per gallon per minute for 1 to 6 hours to oxidize the liquor to a pH of 3.5 to 4.5, adding 5 to 25% of the total solids weight of at least one of a group consisting of sodium and potassium dichromate in aqueous solution to reduce the solids content to not substantially more than 30% to avoid gel formation and spray drying the mixture within 30 minutes of the addition of the dichromate.

References Cited in the file of this patent

UNITED STATES PATENTS

| | | |
|---|---|---|
| 1,878,828 | Cross et al. | Sept. 20, 1932 |
| 2,041,560 | Mauersberger | May 19, 1936 |
| 2,401,373 | Robinson et al. | June 4, 1946 |
| 2,724,697 | Lipkin | Nov. 22, 1955 |